W. H. TOUCHETTE.
DOUBLE EXPOSURE PREVENTER.
APPLICATION FILED SEPT. 6, 1918.
1,303,742.
Patented May 13, 1919.
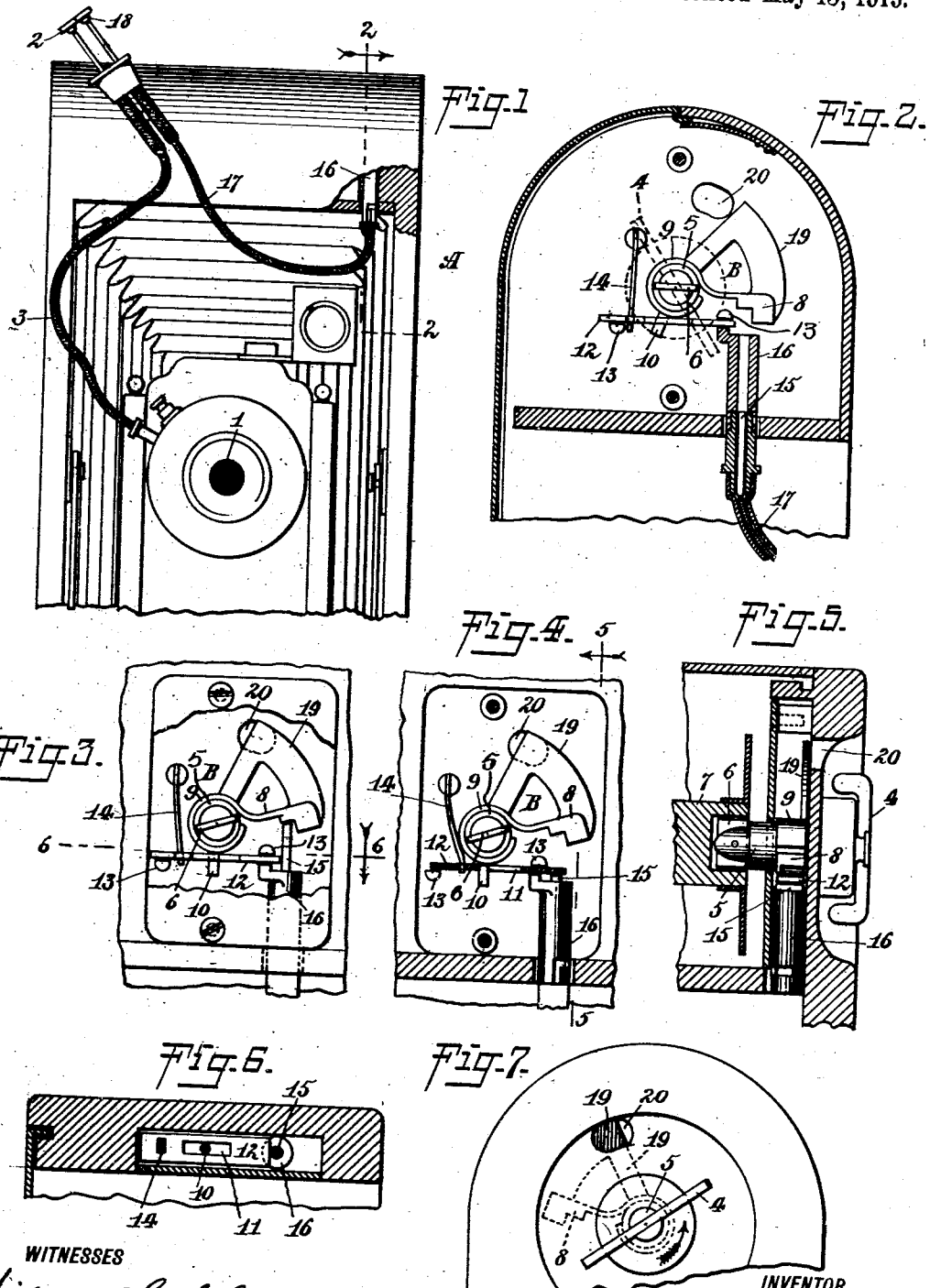
WITNESSES
William P. Goebel.
C. Bradway.
INVENTOR
William H. Touchette
BY Munn & Co
ATTORNEYS

UNITED STATES PATENT OFFICE.

WILLIAM H. TOUCHETTE, OF BURLINGTON, VERMONT, ASSIGNOR OF ONE-HALF TO FOSTER R. CLEMENT, OF BURLINGTON, VERMONT.

DOUBLE-EXPOSURE PREVENTER.

1,303,742.   Specification of Letters Patent.   Patented May 13, 1919.

Application filed September 6, 1918. Serial No. 252,892.

*To all whom it may concern:*

Be it known that I, WILLIAM H. TOUCHETTE, a citizen of the United States, and a resident of Burlington, in the county of Chittenden and State of Vermont, have invented a new and Improved Double-Exposure Preventer, of which the following is a full, clear, and exact description.

This invention relates to film cameras and has to deal more particularly with a device for preventing a second exposure and also for indicating an exposure.

The invention has for its general objects to provide a comparatively simple, inexpensive and reliable device of this character which is so designed that when the shutter is operated a locking means is brought into operative position for preventing a second operation of the shutter-controlling means in case the operator should forget to move the film for the next picture.

Another object of the invention is the provision of a locking device of the character referred to which is automatically reset as soon as the film is moved.

Another object of the invention is the provision of an indicator which is operated when the shutter is opened for an exposure, so that by means of the indicator the operator can ascertain whether or not an exposure has been made.

With such and other objects in view, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views, Figure 1 is front view of a camera with a portion broken away showing the double exposure preventer applied thereto;

Fig. 2 is an enlarged sectional view on the line 2—2, Fig. 1;

Figs. 3 and 4 are detail views showing the parts of the double exposure preventer in different positions;

Fig. 5 is a vertical section on the line 5—5, Fig. 4;

Fig. 6 is a vertical section on the line 6—6, Fig. 3;

Fig. 7 is a fragmentary side view of the camera.

Referring to the drawings, A designates a camera of any approved construction which has a shutter 1 operated by a pushbutton 2 through the usual flexible plunger device 3. The operation of the pushbutton is controlled by a double exposure-preventing means B which is associated with the winding button 4 of the film. This button is mounted on a stud shaft 5 in the usual manner, which shaft has a key 6 adapted to interlock with the spool 7 for the film.

The device B comprises an arm 8 having a portion 9 coiled around the shaft 5 and having a clutching or frictional engagement therewith so that the shaft can be turned without the arm interfering, as when winding the film. The spring hub portion 9 of the arm 8 has a projection 10 which engages in the slot 11 of the slide or locking element 12. This latter is movable along guides 13 and is urged into locking position by a spring 14. The projection 10 by engaging the left end of the slot 11, Fig. 4, serves to return the locking element 12 from the position shown in Fig. 4 to the normal position shown in Fig. 3. Adjacent the arm 8 is an operating element 15 movable in a stationary guide 16 so that when the shutter of the camera is operated the element 15 moves the arm 8 from the position shown in Fig. 2 to that shown in Fig. 3. When the shutter actuating means is released the member 15 returns to normal position, and in so doing the locking device 12 is moved by the spring 14 from the position shown in Fig. 3 to that shown in Fig. 4. The parts remain in the position shown in Fig. 4 until the winding key 4 is turned, and if a second exposure is attempted without turning the key 4, the shutter will not operate, because the member 15, which moves with the shutter-actuating means, is prevented from moving, owing to the locking device 12 extending over it or in the path thereof. When the key 4 is turned to wind up the exposed section of the film, the arm 8 will, by frictional engagement with the shaft 5, shift from the position shown in Fig. 4 to that shown in Fig. 2, so that the locking device will again be actuated when another exposure is made.

When the shutter is operated by the pushbutton and flexible follower, as shown in Fig. 1, the member 15 may be a part of a second flexible plunger 17, which has a pushbutton 18 rigidly connected with the pushbutton 2, so that the member 15 will be actuated simultaneously with the shutter of the camera.

The arm 8 carries an indicator 19 which moves with the arm 8 and will be exposed through a view opening 20 in the side of the camera when an exposure has been made, and when the key 4 is turned this indicator is moved to a non-indicating position at one side of the view opening.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. In a camera, the combination of a film-winding device, a member having a frictional engagement with the shaft of the device to move therewith and to permit the device to be moved independently of the member, a shutter-actuating means, a member movable with the said means to move the first-mentioned member, a lock operated by the first mentioned member to move it to locking position to prevent a second operation of the last-mentioned member after the shutter-actuating means has been operated and released, and means for automatically restoring the lock and the first-mentioned member when the winding mechanism has been actuated.

2. A camera including a shutter, a pushbutton, a flexible follower for actuating the shutter by the pushbutton, a film-winding device, a member mounted on the shaft of the winding device to turn therewith or independently thereof, a second flexible follower connected with the pushbutton, and a lock for the second follower and controlled by the said member, whereby the pushbutton is prevented from operating unless the winding device is operated after an exposure.

3. In a camera, the combination of a spool-winding shaft, an arm having a frictional engagement therewith, a shutter-actuating device, a member connected with the device to move therewith and arranged to operate the arm, a spring-actuated slide movable into the path of the member for preventing movement thereof, and means connected with the arm to permit the slide to move to lock the device and operating to restore the slide when the arm returns to normal position upon the operation of the spool-winding shaft.

4. In a camera, a spool winding shaft, a member mounted on the shaft to have frictional engagement therewith and having a projection on its hub, a flexible follower for operating the member, and a spring actuating slide movable over the follower, said slide being provided with a slot engaged by the said projection.

5. In a camera, a spool winding shaft, an arm frictionally mounted on the shaft and provided with a projection on its hub, an indicator carried by the arm, a shutter actuating device, a member connected with the actuating device to move therewith for operating the said arm, and a spring actuated slide movable into the path of the said member for preventing movement thereof, said slide being provided with a slot engaged by the projection of the arm to move it out of the path of said member.

WILLIAM H. TOUCHETTE.